United States Patent
Zhao et al.

(10) Patent No.: US 8,443,211 B2
(45) Date of Patent: May 14, 2013

(54) HIBERNATION OR SUSPEND USING A NON-VOLATILE-MEMORY DEVICE

(75) Inventors: Qun Zhao, Pleasanton, CA (US); Hsing-Yi Chiang, Taipei (TW); Xinhai Kang, San Jose, CA (US); Chee Hoe Chu, San Jose, CA (US); Lihan Chang, San Jose, CA (US); Jin-Nan Liaw, San Jose, CA (US); Robyn Jie Li, Cupertino (CA)

(73) Assignee: Marvell World Trade Ltd., St. Michael (BB)

(*) Notice: Subject to any disclaimer, the term of this patent is extended or adjusted under 35 U.S.C. 154(b) by 448 days.

(21) Appl. No.: 12/636,558

(22) Filed: Dec. 11, 2009

(65) Prior Publication Data

US 2010/0174934 A1     Jul. 8, 2010

Related U.S. Application Data

(60) Provisional application No. 61/142,502, filed on Jan. 5, 2009, provisional application No. 61/142,699, filed on Jan. 6, 2009, provisional application No. 61/143,548, filed on Jan. 9, 2009.

(51) Int. Cl.
G06F 1/26 (2006.01)
G06F 1/32 (2006.01)

(52) U.S. Cl.
USPC .......... 713/300; 713/320; 713/324; 712/228; 365/228

(58) Field of Classification Search .......... 713/300, 713/320, 324; 712/228; 365/228
See application file for complete search history.

(56) References Cited

U.S. PATENT DOCUMENTS

| | | |
|---|---|---|
| 5,390,165 A | 2/1995 | Tuch |
| 5,481,733 A | 1/1996 | Douglis et al. |
| 5,617,118 A | 4/1997 | Thompson |
| 5,673,416 A | 9/1997 | Chee et al. |
| 5,771,356 A | 6/1998 | Leger et al. |
| 5,828,835 A | 10/1998 | Isfeld et al. |
| 5,884,099 A | 3/1999 | Klingelhofer |
| 6,014,722 A | 1/2000 | Rudin et al. |
| 6,092,108 A | 7/2000 | DiPlacido et al. |
| 6,230,277 B1 | 5/2001 | Nakaoka et al. |
| 6,330,626 B1 | 12/2001 | Dennin et al. |
| 6,564,318 B1 | 5/2003 | Gharda et al. |
| 6,711,447 B1 | 3/2004 | Saeed |
| 6,756,988 B1 | 6/2004 | Wang et al. |
| 6,823,472 B1 | 11/2004 | DeKoning et al. |

(Continued)

FOREIGN PATENT DOCUMENTS

| | | |
|---|---|---|
| EP | 1847911 | 10/2007 |
| JP | 08076872 | 3/1996 |

(Continued)

OTHER PUBLICATIONS

"International Preliminary Report on Patentablility", Application No. PCT/US2009/067767, (Jul. 14, 2011), 7 paqes.

(Continued)

*Primary Examiner* — M Elamin

(57) ABSTRACT

This disclosure describes techniques for using a non-volatile-memory device such as flash memory to store memory data during hibernation or suspend. By so doing, hard drives and/or data are safer, and less power may be used.

20 Claims, 4 Drawing Sheets

U.S. PATENT DOCUMENTS

| | | |
|---|---|---|
| 6,832,280 B2 | 12/2004 | Malik et al. |
| 7,089,419 B2 | 8/2006 | Foster et al. |
| 7,103,788 B1 | 9/2006 | Souza et al. |
| 7,126,913 B1 | 10/2006 | Patel et al. |
| 7,194,638 B1 | 3/2007 | Larky |
| 7,266,842 B2 | 9/2007 | Foster et al. |
| 7,299,365 B2 | 11/2007 | Evans |
| 7,308,591 B2 | 12/2007 | Dubinsky |
| 7,356,707 B2 | 4/2008 | Foster et al. |
| 7,496,952 B2 | 2/2009 | Edwards et al. |
| 7,571,216 B1 | 8/2009 | McRae et al. |
| 7,596,614 B2 | 9/2009 | Saunderson et al. |
| 7,606,230 B1 | 10/2009 | Cohen et al. |
| 7,774,635 B2 | 8/2010 | Shiota |
| 7,788,670 B2 | 8/2010 | Bodas et al. |
| 7,818,389 B1 | 10/2010 | Chiang et al. |
| 7,873,841 B2 | 1/2011 | Mullis, II et al. |
| 7,995,596 B2 | 8/2011 | Kuila et al. |
| 8,000,284 B2 | 8/2011 | Lott et al. |
| 8,001,592 B2 | 8/2011 | Hatakeyama |
| 8,095,816 B1 | 1/2012 | Chan |
| 8,139,521 B2 | 3/2012 | Mukherjee et al. |
| 8,171,309 B1 | 5/2012 | Poo |
| 8,296,555 B2 | 10/2012 | Chu |
| 8,321,706 B2 | 11/2012 | Zhang |
| 8,327,056 B1 | 12/2012 | Chan |
| 2002/0069354 A1 | 6/2002 | Fallon et al. |
| 2002/0087816 A1 | 7/2002 | Atkinson et al. |
| 2003/0014368 A1 | 1/2003 | Leurig et al. |
| 2003/0200453 A1 | 10/2003 | Foster et al. |
| 2003/0200454 A1 | 10/2003 | Foster et al. |
| 2003/0208675 A1 | 11/2003 | Burokas et al. |
| 2003/0236991 A1 | 12/2003 | Letsinger |
| 2004/0125679 A1 | 7/2004 | Kwean |
| 2004/0266386 A1 | 12/2004 | Kuo |
| 2005/0033869 A1 | 2/2005 | Cline |
| 2005/0055547 A1 | 3/2005 | Kawamura |
| 2005/0086551 A1 | 4/2005 | Wirasinghe et al. |
| 2005/0108171 A1 | 5/2005 | Bajikar et al. |
| 2005/0138365 A1 | 6/2005 | Bellipady et al. |
| 2005/0156925 A1 | 7/2005 | Fong et al. |
| 2006/0072748 A1 | 4/2006 | Buer |
| 2006/0075259 A1 | 4/2006 | Bajikar et al. |
| 2006/0123248 A1 | 6/2006 | Porter et al. |
| 2006/0136735 A1 | 6/2006 | Plotkin et al. |
| 2006/0142906 A1 | 6/2006 | Brozovich et al. |
| 2006/0156390 A1 | 7/2006 | Baugher |
| 2007/0005824 A1 | 1/2007 | Howard |
| 2007/0011445 A1 | 1/2007 | Waltermann et al. |
| 2007/0038866 A1 | 2/2007 | Bardsley et al. |
| 2007/0097904 A1 | 5/2007 | Mukherjee et al. |
| 2007/0234028 A1 | 10/2007 | Rothman et al. |
| 2007/0260905 A1 | 11/2007 | Marsden et al. |
| 2007/0277051 A1 | 11/2007 | Reece et al. |
| 2007/0297606 A1 | 12/2007 | Tkacik et al. |
| 2008/0016313 A1 | 1/2008 | Murotake et al. |
| 2008/0028243 A1* | 1/2008 | Morisawa ............... 713/323 |
| 2008/0034411 A1 | 2/2008 | Aoyama |
| 2008/0046732 A1 | 2/2008 | Fu et al. |
| 2008/0066075 A1 | 3/2008 | Nutter et al. |
| 2008/0072311 A1 | 3/2008 | Mullick et al. |
| 2008/0104422 A1 | 5/2008 | Mullis et al. |
| 2008/0108322 A1 | 5/2008 | Upp |
| 2008/0120717 A1 | 5/2008 | Shakkarwar |
| 2008/0298289 A1 | 12/2008 | Jeyaseelan |
| 2008/0313462 A1 | 12/2008 | Zhao et al. |
| 2009/0006658 A1 | 1/2009 | Gough |
| 2009/0049222 A1 | 2/2009 | Lee et al. |
| 2009/0199031 A1 | 8/2009 | Zhang |
| 2010/0023747 A1 | 1/2010 | Asnaashari et al. |
| 2010/0070751 A1 | 3/2010 | Chue |
| 2013/0046966 A1 | 2/2013 | Chu |

FOREIGN PATENT DOCUMENTS

| | | |
|---|---|---|
| JP | 10320302 | 12/1998 |
| JP | 2002099502 | 4/2002 |
| JP | 2002215409 | 8/2002 |
| JP | 2004005254 | 1/2004 |

OTHER PUBLICATIONS

"Extensions to Direct Link Setup (DLS) Comments", *IEEE, P802.11z*, (Jul. 2009), pp. 1-3.

"Final Office Action", U.S. Appl. No. 12/098,254, (May 18, 2011), 11 pages.

"Final Office Action", U.S. Appl. No. 12/178,268, (May 25, 2011), 13 pages.

"Non-Final Office Action", U.S. Appl. No. 12/098,254, (Jan. 14, 2011), 8 pages.

"Non-Final Office Action", U.S. Appl. No. 12/101,668, (Apr. 5, 2011), 7 pages.

"Non-Final Office Action", U.S. Appl. No. 12/178,268, (Dec. 22, 2010), 10 pages.

"Non-Final Office Action", U.S. Appl. No. 12/271,761, (Oct. 3, 2011), 6 pages.

"Non-Final Office Action", U.S. Appl. No. 12/541,731, (Oct. 21, 2011), 9 pages.

"Notice of Allowance", U.S. Appl. No. 12/098,254, (Sep. 28, 2011), 4 pages.

"Part 11—Wireless LAN Medium Access Control (MAC) and Physical Layer (PHY) Specifications", *Information Technology—Telecommunications & Information Exchange Between Systems... International Standard, ISO/IEC 8802-11, First Ed.*, (1999), pp. 1-531.

"PCT Partial Search Report", Application Serial No. PCT/US2008/078343, Partial International Search,(Mar. 5, 2009), 2 pages.

"PCT Search Report", Application No. PCT/US2009/056973, (Nov. 4, 2009), 13 pages.

"PCT Search Report", Application Serial No. PCT/US2008/078343, (May 18, 2009), 5 pages.

"Restriction Requirement", U.S. Appl. No. 12/101,668, (Sep. 22, 2011), 6 pages.

"PCT Search Report and Written Opinion", Application No. PCT/US2009/067767, (Mar. 26, 2010), 12 pages.

"Non-Final Office Action", U.S. Appl. No. 12/559,987, Nov. 9, 2011, 10 pages.

"Non-Final Office Action", U.S. Appl. No. 12/178,268, Dec. 21, 2011, 13 pages.

"Notice of Allowance", U.S. Appl. No. 12/098,254, Dec. 14, 2011, 4 pages.

"Notice of Allowance", U.S. Appl. No. 12/271,761, Jan. 3, 2012, 6 pages.

"Final Office Action", U.S. Appl. No. 12/541,731, May 31, 2012, 11 pages.

"Final Office Action", U.S. Appl. No. 12/101,668, May 10, 2012, 8 pages.

"Foreign Office Action", European Patent Application No. 09803951.4, May 24, 2012, 3 pages.

"Non-Final Office Action", U.S. Appl. No. 12/541,731, Sep. 4, 2012, 11 pages.

"Non-Final Office Action", U.S. Appl. No. 13/333,551, Apr. 6, 2012, 5 pages.

"Non-Final Office Action", U.S. Appl. No. 12/101,668, Aug. 9, 2012, 8 pages.

"Notice of Allowance", U.S. Appl. No. 13/333,551, May 30, 2012, 4 pages.

"Notice of Allowance", U.S. Appl. No. 12/178,268, Jul. 2, 2012, 4 pages.

"Notice of Allowance", U.S. Appl. No. 12/559,987, Jun. 15, 2012, 5 pages.

"Foreign Office Action", Japanese Application No. 2011-527899, Nov. 6, 2012, 4 pages.

"Supplemental Notice of Allowance", U.S. Appl. No. 13/333,551, Oct. 23, 2012, 2 pages.

"Foreign Office Action", European Patent Application No. 09803951.4, Dec. 13, 2012, 6 pages.

"Foreign Office Action", Japanese Application No. 2011-544456, Jan. 29, 2013, 7 pages.

"Notice of Allowance", U.S. Appl. No. 12/101,668, Jan. 11, 2013, 6 pages.

"Supplemental Notice of Allowance", U.S. Appl. No. 12/101,668, Feb. 8, 2013, 4 Pages.

* cited by examiner

HIBERNATION OR SUSPEND USING A NON-VOLATILE-MEMORY DEVICE

RELATED APPLICATIONS

This application claims priority to U.S. Provisional Patent Application Ser. No. 61/142,502 filed Jan. 5, 2009, the disclosure of which is incorporated by reference herein in its entirety. This application also claims priority to U.S. Provisional Patent Application Ser. No. 61/142,699 filed Jan. 6, 2009, the disclosure of which is incorporated by reference herein in its entirety. This application also claims priority to U.S. Provisional Patent Application Ser. No. 61/143,548 filed Jan. 9, 2009, the disclosure of which is incorporated by reference herein in its entirety.

BACKGROUND

Modern computing devices employ power-saving modes when not in use. Hibernation is a mode in which an operating system (OS) saves memory data from volatile system-memory to an OS boot partition of a hard drive in the form of a hibernation file, after which the computing device is shut down. When turned back on, the basic input output system (BIOS) of the computing device posts and then loads an OS boot loader. The OS boot loader copies the memory data within the hibernation file back into the volatile system-memory. The OS boot loader then resumes operation of the operating system where the operating system was paused instead of booting the operating system as normal. This allows for currently running applications to retain their data even if the data was not saved before hibernation.

Suspend is a mode in which the operating system shuts down power to most of the devices within the computing device but not to the volatile system-memory such that the memory data is preserved. To resume full use, the operating system powers on the devices and resumes operation using the memory data that was preserved. Suspend uses significantly more power than hibernation but is much faster.

While these modes serve their respective purposes they have undesired limitations. Hibernation mode can be slow to begin and can lose data. Hibernation mode can be slow to begin because it is limited by the speed at which the hard drive can save the memory data to the hibernation file. A computer's data is often stored on a spinning-media hard-disk drive, which is spinning while the hibernation mode is beginning; this presents a data-safety issue. Any substantial movement of the computing device is potentially hazardous while the drive is still spinning. A user who selects to hibernate his laptop, closes the lid, and goes on his way may damage the hard drive and the data it contains. Furthermore, during the time that the hard drive is spinning, both it and the computing device are using power. This is undesirable if the hibernation occurred due to a critical battery alarm because the computing device may run out of power before the hibernation is complete. Even if the device's battery does not fail, using additional power contradicts the point of a power-saving mode.

Suspend mode also has undesired limitations. While significantly faster than hibernation, it uses more power because the volatile system-memory remains powered. Furthermore, if the computing device's power source is lost while suspended, the memory data may not be recovered and any information not saved to the hard disk will likely be lost. This can easily occur, such as when the user unplugs the computing device or when a power source fails.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This summary is provided to introduce subject matter that is further described below in the Detailed Description and Drawings. Accordingly, this Summary should not be considered to describe essential features nor used to limit the scope of the claimed subject matter.

In one embodiment, a method is described that comprises monitoring operating status of a computing device, the operating status including a suspend mode, directing a non-volatile-memory controller to copy memory data from a volatile system-memory into a non-volatile-memory device in response to detecting a notification of the suspend mode, and directing the non-volatile-memory controller to copy the memory data from the non-volatile-memory device into the volatile system-memory in response to receiving a request to resume from the suspend mode. This embodiment may include receiving, from the non-volatile-memory controller, a notification that the memory data has been copied to the non-volatile-memory device, responsive to receiving the notification, shutting down power to the volatile system-memory, and responsive to receiving a request to wake from the suspend mode, powering up the volatile system-memory. This embodiment may include receiving, from the non-volatile-memory controller, a notification that the memory data has been copied from the non-volatile-memory device into the volatile system-memory, the notification indicating that the memory data is available for an operating system to use to resume from the suspend mode.

In another embodiment, a method is described that comprises monitoring operating status of a computing device, the operating status including a hibernation mode, receiving a notification of the hibernation mode from an operating system of the computing device, and in response to the notification, copying memory data from a volatile system-memory to a non-volatile-memory device as a hibernation file, wherein the non-volatile-memory device is not a memory device from which the operating system is booted. This embodiment may include requesting a hard drive to spin-down, the requesting performed prior to copying the memory data from the volatile system-memory to the non-volatile-memory device.

In still another embodiment, a system is described that comprises a non-volatile-memory device, a volatile system-memory, a processor, a hibernation-file handler configured to save a hibernation file to the non-volatile-memory device instead of a hard drive or solid-state-disk from which an operating system is booted, and a BIOS-side hibernation handler configured to redirect a BIOS interrupt 13hex call and cause the hibernation file to be read from the non-volatile-memory device. This embodiment may include a non-volatile-memory controller and a suspend handler configured to direct the non-volatile-memory controller to copy memory data from the volatile system-memory into the non-volatile-memory device in response to a notification of a suspend mode and copy the memory data from the non-volatile-memory device into the volatile system-memory in response to a notification of a resume from the suspend mode. This embodiment may additionally include an on-chip accelerator located within the non-volatile-memory controller, the on-chip accelerator configured to compress the memory data when copying the memory data into the non-volatile-memory device and decompress the memory data when copying the memory data into the volatile system-memory.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

As noted in the Background above, conventional methods of implementing hibernation and suspend modes have undesired limitations. Hibernation mode is slow and may damage hard drives. Suspend mode uses more power and memory data may not be preserved during a power failure. The present disclosure describes techniques for using a non-volatile-memory device such as flash memory to store the memory data during hibernation or suspend. By so doing, hard drives and/or data are safer, and less power may be used.

In the discussion that follows, an example operating environment is described. Example methods are also described that may be employed in the example operating environment as well as other environments. In the discussion below, reference will be made to the environment by way of example only and, therefore, implementations described below are not limited to the example environment.

Example Operating Environment

Figure 1:
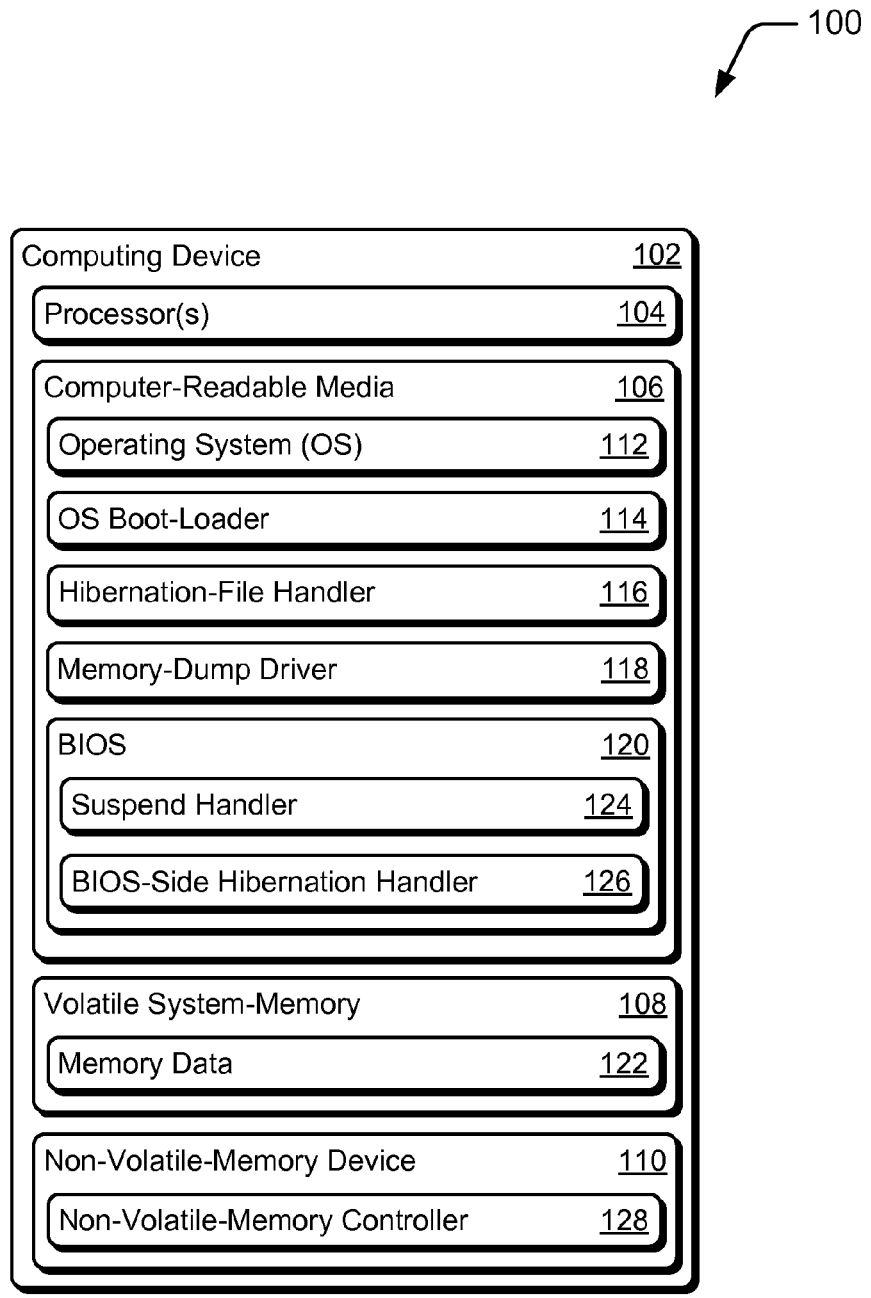
FIG. 1 illustrates an example operating environment configured to enable hibernation or suspend using a non-volatile-memory device.

FIG. 1 illustrates an example operating environment 100 having a computing device 102. Computing device 102 includes one or more processors 104, one or more computer-readable media 106, volatile system-memory 108, and non-volatile-memory device 110. Computer-readable media 106 may include various kinds of media, such as volatile (e.g., Static Random Access Memory, or SRAM) and non-volatile memory (e.g. flash memory, BIOS Chip, solid state disk, spinning-media hard-disk drive, or CD/DVD). Computer-readable media 106 may include volatile system-memory 108, non-volatile-memory device 110, and/or any other computer-readable media. Volatile system-memory 108 loses data when power is removed.

Non-volatile-memory device 110 retains data when power is removed. Non-volatile-memory device 110 may include non-volatile memory such as flash memory or solid state disks. Non-volatile-memory device 110 can have a storage capacity as small as the storage capacity of volatile system-memory 108 or even smaller if compression is used. In computing devices that implement hibernation, non-volatile-memory device 110 does not include an OS bootable spinning-media hard-disk drive or an OS bootable solid state disk. OS bootable memory are those that include a bootable partition for operating system 112 and OS boot-loader 114. In computing devices that implement both hibernation and suspend, there may be a separate non-volatile-memory device for each of hibernation and suspend.

Mechanisms for interfacing non-volatile-memory device 110 with other components of computing device 102 may include, but are not limited to, the use of an internal data bus, a Small Computer System Interface (SCSI), an Internet Small Computer System Interface (iSCSI), a Peripheral Component Interconnect bus (PCI), a PCI eXtended bus (PCI-X), a Peripheral Component Interconnect Express bus (PCIe), a Universal Serial Bus (USB), a Serial ATA bus (SATA), a Serial Attached SCSI bus (SAS), or a Fiber Channel network (FC). For example, non-volatile-memory device 110 may be a flash memory device that is communicatively attached to the other components of computing device 102 through a PCIe connection.

Computer-readable media 106 is shown including operating system (OS) 112, OS boot-loader 114, hibernation-file handler 116, memory-dump driver 118, and BIOS 120. Operating system 112 is configured to operate computing device 102. OS boot-loader 114 is typically installed when installing operating system 112. During a normal boot of computing device 102, BIOS 120 loads OS boot-loader 114, which then loads operating system 112.

Hibernation-file handler 116 can be software and/or hardware that intercepts memory data 122 to be written to a hard drive and redirects it to non-volatile-memory device 110. In some cases, hibernation-file handler 116 is a SCSI miniport-driver that intercepts memory data 122 from memory-dump driver 118 when driver 118 attempts to write memory data 122 to the hard drive. In other cases, hibernation-file handler 116 is software that intercepts a command from operating system 112 to memory-dump driver 118 to request storage of a hibernation file on a spinning-media hard-disk drive. Hibernation-file handler 116 intercepts this command and saves the hibernation file to memory device 110 instead of the hibernation file being stored on the spinning-media hard-disk drive. Alternatively, memory-dump driver 118 is configured to store the hibernation file on memory device 110. In such a case, environment 100 may not include a separate hibernation-file handler 116. In systems that do not implement a hibernation feature, environment 100 may not include hibernation-file handler 116 and memory-dump driver 118.

BIOS 120 is shown including suspend handler 124 and BIOS-side hibernation handler 126, though both may not be present if only one of hibernation or suspend is implemented. Suspend handler 124 comprises computer instructions configured to request that non-volatile-memory controller 128 copy memory data 122 in and out of volatile system-memory 108 and non-volatile-memory device 110. Suspend handler 124 may also provide non-volatile-memory controller 128 with the address or addresses of one or more locations within volatile system-memory 108.

BIOS-side hibernation handler 126 comprises computer instructions configured to redirect requests from OS boot-loader 114. The requests may include BIOS INT $13_{hex}$ requests, which are redirected to read from non-volatile-memory device 110 instead of a hard disk intended by the requests. This redirection causes the hibernation file to be loaded from non-volatile-memory device 110 on system boot up. Operating system 112 then uses the loaded memory data 122 to resume from hibernation.

Volatile system-memory 108 is shown including memory data 122, which is preserved in non-volatile-memory device 110 during hibernation or suspend. Non-volatile-memory device 110 includes non-volatile-memory controller 128. Non-volatile-memory controller 128 is configured to copy memory data 122 into and out of non-volatile-memory device 110. Memory data 122 may be compressed prior to being saved to non-volatile-memory device 110 and decompressed prior to being saved to volatile system-memory 108. This compression is performed or aided by software within suspend handler 124 or by an on-chip accelerator, or a combination of both. The on-chip accelerator may be located within non-volatile-memory controller 128. Note that one or more of the entities shown in FIG. 1 may be further divided, combined, and so on. Thus, environment 100 illustrates some of many possible environments capable of employing the described techniques.

Example Methods

The present disclosure describes techniques for suspending or hibernating a computing device using a non-volatile-memory device to preserve the memory data. This allows for additional power savings as well as enhanced data safety. These techniques are described using three different methods, though they may act independently or in combination. Aspects of these methods may be implemented in hardware, firmware, software, or a combination thereof. The methods are shown as a set of acts that specify operations performed by one or more entities and are not necessarily limited to the order shown.

Figure 2:
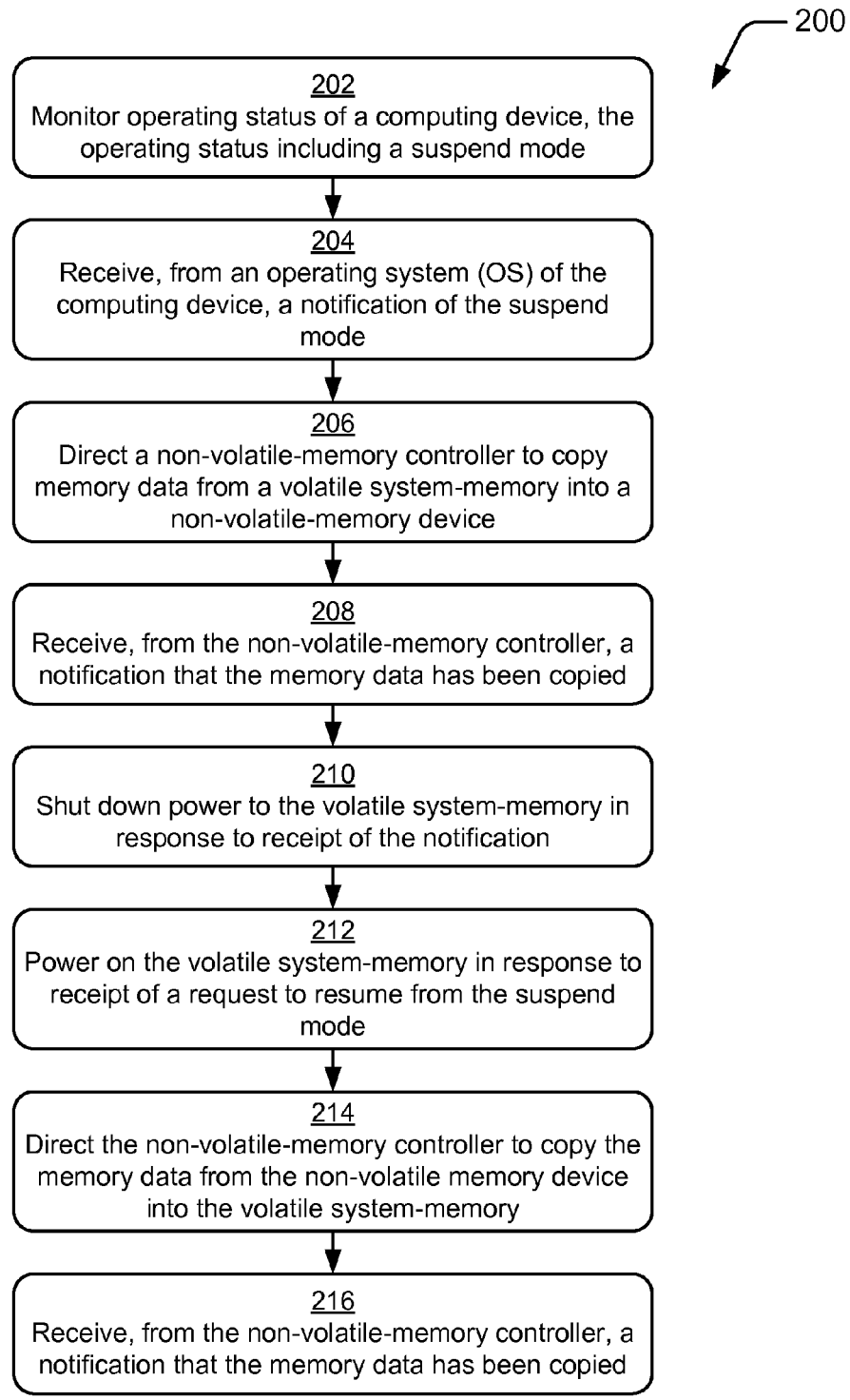
FIG. 2 illustrates a method for suspending or resuming a computing device using a non-volatile-memory device.

FIG. 2 illustrates a method 200 for suspending or resuming a computing device using a non-volatile-memory device. At 202, an operating status of a computing device is monitored. The operating status includes a suspend mode. At 204, a notification of the suspend mode is received from an operating system (OS) of the computing device. For example, suspend handler 124 (FIG. 1) within BIOS 120 receives the notification of suspend from operating system 112.

At 206, a non-volatile-memory controller is directed to copy memory data from volatile system-memory into a non-volatile-memory device. For example, suspend handler 124 issues a request to have non-volatile-memory controller 128 copy memory data 122 from volatile system-memory 108 into non-volatile-memory device 110. The request may include one or more addresses of corresponding locations within volatile system-memory 108 to copy. In this case, controller 128 copies memory data 122 that is addressed. In alternative cases, if no addresses are provided, controller 128 copies all of memory data 122.

Storing memory data 122 in non-volatile-memory device 110 provides extra data security because non-volatile-memory device 110 retains its data during a power failure. A power failure during a conventional suspend can result in a hard shut-down of computing device 102, which results in memory data 122 being lost. Powering on from this state requires a normal system boot, which takes considerably longer than resuming from a suspended state.

At 208, a notification indicating that the memory data has been copied is received from the non-volatile-memory controller. For example, suspend handler 124 receives a notification from controller 128 that memory data 122 has been copied into non-volatile-memory device 110.

At 210, power to the volatile system-memory is shut down in response to receiving the notification at 208. Here, suspend handler 124 or other components within BIOS 120 shut down power to volatile system-memory 108. This saves additional power while computing device 102 is in suspend mode.

At 212, the volatile system-memory is powered on in response to receiving a request to resume from the suspend mode. This is implemented if 210 is implemented. The request to resume from suspend may come from various sources, such as a keyboard key press, a mouse movement or click, a system wake-up event, or a wake-on-LAN request. For example, suspend handler 124 receives a request to resume and powers on volatile system-memory 108.

At 214, the non-volatile-memory controller is directed to copy the memory data from the non-volatile-memory device into the volatile system-memory. The directing at 214 is similar to the directing at 206 except that the memory data is requested to be copied into volatile system-memory instead of out of volatile system-memory. At 214, the contents of the volatile system-memory are restored to their pre-suspend state. This will allow the operating system to continue operation from where it left off before the suspend paused its operation. Continuing the example, suspend handler 124 requests that non-volatile-memory controller 128 copy memory data 122 from non-volatile-memory device 110 into volatile system-memory 108.

The techniques may optionally compress and decompress the memory data prior to storing it on the non-volatile-memory device and the volatile system-memory, such as through use of an on-chip accelerator added to non-volatile-memory controller 128 or use of suspend handler 124. Compressing the memory data permits use of fewer memory resources to store the contents of the volatile-system-memory. If the compression and decompression is sufficiently fast, it may speed up the storage and retrieval of the memory data because less time is spent saving and retrieving the memory data on the non-volatile-memory device.

At 216, a notification indicating that the memory data has been copied is received. After such notification, the conventional method of resuming from suspend can, but is not required to, be implemented as if a non-volatile-memory device was not used to save the memory data. For example, suspend handler 124 receives a notification from controller 128 indicating that memory data 122 is restored to volatile system-memory 108. Suspend handler 124 or other components within BIOS 120 may continue to act to resume computing device 102 using conventional methods. Operating system 112 is able to power back on any devices that were turned off during the suspend and use memory data 122 to continue operation as though no suspend occurred.

Figure 3:
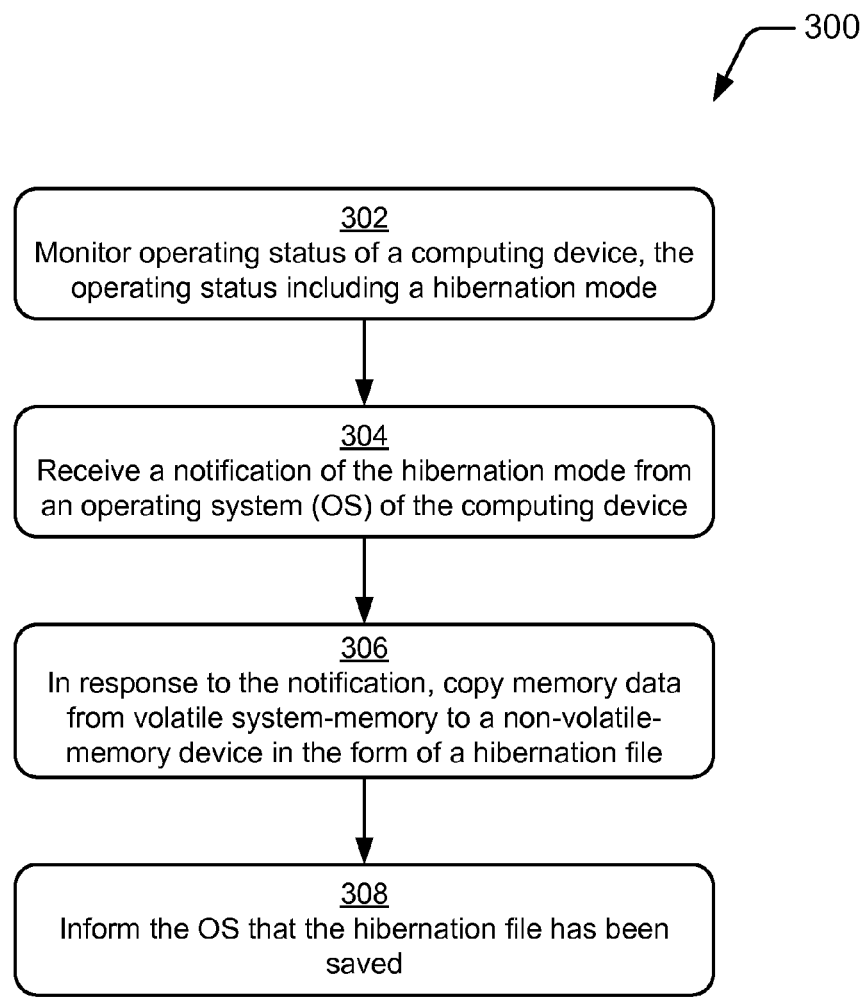
FIG. 3 illustrates a method for hibernating a computing device using a non-volatile-memory device.

FIG. 3 illustrates a method 300 for hibernating a computing device using a non-volatile-memory device to store a hibernation file. Method 300 may be implemented on a computing device that also implements method 200.

At 302, an operating status of a computing device is monitored. The operating status includes a hibernation mode. At 304, a notification of the hibernation mode is received from an operating system (OS) of the computing device. At 306, memory data from volatile system-memory is copied to a non-volatile-memory device in the form of a hibernation file. During conventional hibernation, the operating system loads a memory-dump driver, which dumps memory data to a hibernation file on an OS boot partition located on a hard drive. In this method, the memory-dump driver is modified and/or a hibernation-file handler is used. The hibernation-file handler may comprise computer software added to a computing device, such as computing device 102 of FIG. 1.

By way of example, hibernation-file handler 116 receives a notification of hibernation. Hibernation-file handler 116 intercepts each write command from memory-dump driver 118 and redirects each write command to non-volatile-memory device 110. This causes the hibernation file to be stored on non-volatile-memory device 110 instead of a hard drive intended by the write command(s).

In another example, hibernation-file hander 116 intercepts a command from operating system 112 to memory-dump driver 118. The command is originally intended to instruct memory-dump driver 118 to save memory data 122 to a hard drive. Hibernation-file handler 116 intercepts this command and dumps memory data 122 to a hibernation file. The hibernation file is saved to non-volatile-memory device 110 instead of the hard drive intended by the command.

In another example, memory-dump driver 118 is modified to copy memory data 122 to non-volatile-memory device 110 instead of the OS boot partition of the hard drive. In this case, the method forgoes the use of a separate hibernation-file handler 116.

At 308, the operating system is informed that the hibernation file has been saved. This allows the operating system to continue shutting down power to various components of the computing device. In the example in which hibernation-file handler 116 intercepts each write command from memory-dump driver 118, handler 116 will notify driver 118, which in turn will notify operating system 112. In the example in which hibernation-file hander 116 intercepts a command from operating system 112 to memory-dump driver 118, handler 116 sends operating system 112 a notification when done copying memory data 122. In the example in which memory-dump driver 118 has been modified, driver 118 will notify operating system 112. The notification at 308 allows operating system 112 to continue shutting down the system in hibernation mode.

Storing the hibernation file on a non-volatile-memory device that is separate from an OS boot disk allows for faster hibernation and resumption in cases where the non-volatile-memory device is faster than the OS boot disk. The OS boot disk is a disk that has a boot partition for the OS. In an example in which the OS boot disk is a solid-state-disk, this method can still be beneficial as faster memory can be used to store the hibernation file. The size requirements for the OS boot disk are quite large and thus it can be cost prohibitive to use large amounts of the fastest memory. Furthermore, use of a solid-state-disk as the OS boot disk is often cost prohibitive because the cost per capacity is greater than with spinning-media hard-disk drives. The non-volatile-memory device of method 300 can be small enough to only store a hibernation file. In such a case it is often economical to use the fastest memory available.

Additionally the techniques may request one or more spinning-media hard-disk drives in the computing device to spin-down. This allows for additional power savings and data safety. As a separate non-volatile-memory device is used to store the hibernation file, spinning-media hard-disk drives are no longer needed as soon as the hibernation process begins and can safely be spun down. This act is performed prior to 306 if maximum power savings and data safety are desired.

Figure 4:
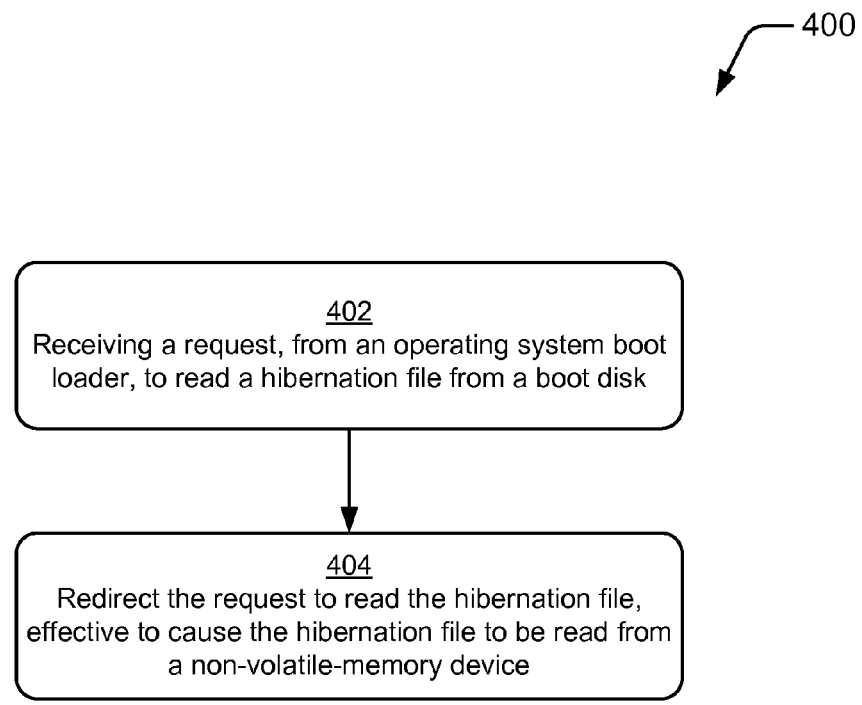
FIG. 4 illustrates a method for resuming a computing device from hibernation using a non-volatile-memory device.

FIG. 4 illustrates a method 400 for resuming a computing device from hibernation, which may be implemented on a computing device that also implements method(s) 200 and/or 300.

At 402, a request to read a hibernation file from a boot disk is received. In some conventional approaches, when hibernation is to be terminated, the OS boot loader uses BIOS interrupt $13_{hex}$ to read the hibernation file from the OS boot disk. In this method, a BIOS-side hibernation handler can instead receive the request. For example, BIOS-side hibernation handler 126 of FIG. 1 receives the request to read all or part of the hibernation file. The request is received from OS boot-loader 114.

At 404, the request to read the hibernation file from the OS boot disk is redirected and the hibernation file is read from a non-volatile-memory device. Continuing the example, BIOS-side hibernation handler 126 reads the hibernation file from non-volatile-memory device 110 instead of from the OS boot disk as requested. If the hibernation file is not found, BIOS-side hibernation handler 126 may then read from the OS boot disk. Once memory data 122 within the hibernation file is loaded into volatile system-memory 108, operating system 112 resumes operation using memory data 122.

Note that OS boot-loader 114 may be modified to read the hibernation file from non-volatile-memory device 110 and as such, no redirection is used. In this case, BIOS-side hibernation handler 126 is part of OS boot-loader 114, such that the modified OS boot-loader requests the hibernation file from the non-volatile-memory device and loads the memory data that is within the hibernation file into volatile system-memory.

One or more of the techniques described above can be performed by one or more programmable processors executing a computer program to perform functions by operating on input data and generating output. Generally, the techniques can take the form of an entirely hardware embodiment, an entirely software embodiment, or an embodiment containing both hardware and software components. In one implementation, the methods are implemented in software, which includes but is not limited to firmware, resident software, microcode, etc. Furthermore, the methods can take the form of a computer program product accessible from a computer-usable or computer-readable medium providing program code for use by or in connection with a computer or any instruction execution system.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:
1. A method comprising:
   monitoring an operating status of a computing device, the operating status including a suspend mode during which power is maintained to at least a volatile system-memory of the computing device;
   directing, in response to detecting a suspend mode notification, a flash-memory controller to copy memory data from the volatile system-memory into a flash-memory device via a Peripheral Component Interconnect Express (PCI Express) bus;
   causing, while the memory data is copied into the flash-memory device, the flash-memory controller to compress the memory data via an on-chip accelerator;
   directing, in response to receiving a request to resume from the suspend mode, the flash-memory controller to copy the memory data from the flash-memory device into the volatile system-memory; and
   causing, while the memory data is copied into the volatile system-memory, the flash-memory controller to decompress the memory data via the on-chip accelerator.

2. The method as recited in claim 1, further comprising:
receiving, from the flash-memory controller, a notification that the memory data has been copied to the flash-memory device;
responsive to receiving the notification, shutting down power to the volatile system-memory; and
responsive to receiving a request to wake from the suspend mode, powering up the volatile system-memory.

3. The method as recited in claim 1, further comprising receiving, from the flash-memory controller, a notification that the memory data has been copied from the flash-memory device into the volatile system-memory, the notification indicating that the memory data is available for an operating system of the computing device to use to resume from the suspend mode.

4. The method as recited in claim 1, wherein the suspend mode notification is received from an operating system of the computing device and comprises:
a request to enter the suspend mode; or
an indication that the computing device is going to suspend.

5. The method as recited in claim 1, wherein the volatile system-memory includes static random access memory (SRAM).

6. The method as recited in claim 1, wherein the flash-memory device does not include a boot partition useful to boot an operating system of the computing device.

7. The method as recited in claim 1, wherein:
directing the flash-memory controller to copy the memory data from the volatile system-memory into the flash-memory device includes communicating a source address corresponding to a location within the volatile system-memory to the flash-memory controller; and
directing the flash-memory controller to copy the memory data from the flash-memory device into the volatile system-memory includes communicating a destination address corresponding to a location within the volatile system-memory to the flash-memory controller.

8. A method comprising:
monitoring operating status of a computing device, the operating status including a hibernation mode;
receiving a notification of the hibernation mode from an operating system of the computing device;
in response to the notification, copying memory data from a volatile system-memory to a flash-memory device via a Peripheral Component Interconnect Express (PCI Express) bus as a hibernation file; and
compressing, when copying the memory data to the flash memory device, the memory data via an on-chip accelerator of a flash-memory controller of the flash-memory device prior to storing the memory data to the flash-memory device.

9. The method as recited in claim 8, wherein receiving the notification of the hibernation mode includes intercepting a command from the operating system to a memory-dump driver, the command comprising instructions to save the memory data from the volatile system-memory to a hard-drive.

10. The method as recited in claim 8, wherein copying the memory data from the volatile system-memory to the flash-memory device as the hibernation file includes intercepting a data write command from a memory-dump driver to a hard drive and redirecting the data write command to the flash-memory device.

11. The method as recited in claim 8, wherein receiving the notification includes receiving a command from the operating system, the command comprising instructions to save the memory data from the volatile system-memory to the flash-memory device as the hibernation file.

12. The method as recited in claim 8, wherein the flash-memory device is different from, and smaller in capacity than, a non-volatile-memory device from which the operating system of the computing device is booted.

13. The method as recited in claim 8, further comprising requesting a hard drive to spin-down, the requesting performed prior to copying the memory data from the volatile system-memory to the flash-memory device.

14. The method as recited in claim 8, wherein copying the memory data from the volatile system-memory to the flash-memory device as the hibernation file enables the operating system to resume from the hibernation mode using the memory data that was saved in the hibernation file.

15. The method as recited in claim 14, wherein a Basic Input Output System (BIOS) is modified to redirect a call from an OS boot loader and the modified BIOS causes the hibernation file to be read from the non-volatile-memory device instead of a hard disk.

16. The method as recited in claim 15, wherein the call that is redirected is a BIOS interrupt 13hex call.

17. A computing device comprising:
a flash-memory device;
a volatile system-memory;
a flash-memory controller having an on-chip accelerator and operably coupled with the volatile system-memory via a Peripheral Component Interconnect Express (PCI Express) bus;
a processor;
a hibernation-file handler configured to save a hibernation file to the flash-memory device instead of a hard drive or solid-state-disk from which an operating system is booted;
a BIOS-side hibernation handler configured to redirect a BIOS interrupt 13hex call and cause the hibernation file to be read from the flash-memory device; and
a suspend handler configured to direct the flash-memory controller to:
copy memory data from the volatile system-memory into the flash-memory device in response to a notification of a suspend mode, the memory data compressed via the on-chip accelerator while being copied into the flash-memory device; and
copy the memory data from the flash-memory device into the volatile system-memory in response to a notification of a resume from the suspend mode, the memory data decompressed via the on-chip accelerator while being copied from the flash-memory device.

18. The computing device as recited in claim 17, wherein the hibernation-file handler is a Small-Computer-System-Interface (SCSI) miniport-driver configured to:
intercept a data write command from a memory-dump driver to the hard drive; and
redirect the data write command to the flash-memory device.

19. The computing device as recited in claim 17, wherein:
the flash memory device is a first flash-memory device;
the computing device further comprises a second flash-memory device;
the hibernation-file handler is further configured to save the hibernation file to the first flash-memory device; and
the suspend handler configured to direct the flash-memory controller to copy the memory data from the volatile system-memory into the second flash-memory device.

20. The computing device as recited in claim 19, wherein the second flash-memory device is operably coupled with the volatile system-memory via the PCI Express bus.

* * * * *